United States Patent [19]
Larkin

[11] Patent Number: 5,795,200
[45] Date of Patent: Aug. 18, 1998

[54] CONTRA-ROTATING ROTOR UNIT

[76] Inventor: Bryan James Larkin, 670 Beach Road, Surf Beach, New South Wales 2536, Australia

[21] Appl. No.: 809,037

[22] PCT Filed: Sep. 22, 1995

[86] PCT No.: PCT/AU95/00624

§ 371 Date: Mar. 25, 1997

§ 102(e) Date: Mar. 25, 1997

[87] PCT Pub. No.: WO96/09954

PCT Pub. Date: Apr. 4, 1996

[30] Foreign Application Priority Data

Sep. 26, 1994 [AU] Australia ................. PM 8421

[51] Int. Cl.[6] ................................. B63H 5/10
[52] U.S. Cl. ................ 440/81; 440/89; 416/129 A
[58] Field of Search .................... 440/67, 75, 79–83, 440/88, 89; 416/129 A, 129 R

[56] References Cited

U.S. PATENT DOCUMENTS

| 2,282,266 | 5/1942 | Swaskey | 416/129 |
| 2,394,299 | 2/1946 | Friedrich | 416/129 |
| 2,765,040 | 10/1956 | Darrah | 416/129 A |
| 4,964,844 | 10/1990 | Bagnall. | |

*Primary Examiner*—Ed L. Swinehart
*Attorney, Agent, or Firm*—Smith-Hill and Bedell

[57] ABSTRACT

A marine propulsion unit has two contra-rotating propellers (15, 16) driven by a single shaft (25) through gearing which includes a set of static planetary gears (40), an external gear (30), and an internal gear (44). The gearing is mounted in an oil-filled gear box having three, co-axial cylindrical sections (12, 13, 14). The outer two sections (12, 14) rotate in opposite directions and provide respective propeller hubs. The intermediate section (13) is stationary and serves as a carrier for the planetary gears (40) and a mount for flow-straightening vanes (18) which support a cylindrical shroud (17). An angular passage (28) may be provided in the intermediate section (13) to exhaust combustion gases through openings in the outside of the shroud (17) when the unit forms part of an outboard motor.

7 Claims, 3 Drawing Sheets

CONTRA-ROTATING ROTOR UNIT

FIELD OF THE INVENTION

THIS INVENTION relates primarily to a type of unit having an assembly providing contra-rotating, coaxial rotors. It is more specifically concerned with the construction of a contra-rotating propeller assembly for a marine propulsion unit. The term "propeller", as used in this specification is to be understood as covering a propeller having blades, such as a marine propeller, and also an impeller having radially-projecting vanes rather than blades, which is also encountered in different types of marine propulsion systems, for example jet boat propulsion systems.

STATE OF THE ART

Proposals have been made for driving two contra-rotating propellers of a marine installation from a single drive shaft. For example, U.S. Pat. No. 4,540,396 (Caires) describes one such proposal for use with an outboard and Canadian Patent No. 2,001,357 (Couture) describes another proposal. Although both proposals enable two propellers to be driven respectively in opposite directions from a single shaft, they have draw-backs which militate against their use commercially.

The Caires proposal involves locating a set of static planetary gears between two opposed annular gears one of which is driven directly by a drive shaft in one direction, and the other of which is driven in the opposite direction indirectly from the drive shaft by way of the planetary gears. Exhaust gasses produced by the outboard motor are fed through an annular tunnel which contains the static planetary gears and extends through the hubs of the propellers. The gases then discharge into the wake of the vessel astern of the propellers.

Caires partially overcomes the loss of efficiency of the assembly caused by discharging exhaust gases into the path of the propeller blades. However this is achieved at the price of allowing water and gas to flow through the meshing teeth of the planetary gears. The risk of water-borne, solid particles washing into the meshing zones of the planetary gears is considerable, as is the likelihood of heavy wear of the gears as there is no way of lubricating them. Thus Caires does not provide a commercially viable arrangement for driving two propellers from a common shaft in an efficient manner.

Couture seeks to overcome the lubrication problem by creating an annular closed chamber between contra-rotating hub-portions of two sets of propeller blades and stuffing the chamber with grease to keep the water out. Opposed, spaced bevel gears are formed respectively on the two propeller hubs and mesh with a ring of crown gears in the chamber. The crown gears rotate about axes which are radial with respect to the drive shaft, so that the rotation of one propeller is transmitted through the crown gears to rotate the other propeller in the opposite direction at the same speed.

The Couture proposal has a number of disadvantages which adversely affect the efficiency of the assembly. For example, the spacing between two contra-rotating propellers is critical and Couture does not allow any arrangement for changing this spacing in a given installation to achieve optimum efficiency. This can only be found empirically. Indeed it seems implicit in the Couture arrangement, for the two propellers to be sited very close to one another which is a very inefficient arrangement. Secondly, Couture does not provide any arrangement for maintaining the grease pressure above that of the outside water so that there is always a risk, which grows with time, of sea water entering the chamber and damaging the gears.

For a contra-rotating propeller assembly to be commercially acceptable, due regard must be paid to a number of different features which affect its efficiency. Firstly, the axial spacing of the two sets of propeller blades can be a critical feature which can only be determined by model testing. Secondly, the thrust of the two propellers, particularly when the vessel is going astern, must be acceptable and this can be varied by designing the propellers to operate at different relative rotational speeds. Thirdly, the gearing is preferably so arranged that there is no risk of sea water contaminating the gears. Fourthly, the bending moment produced on a drive shaft by the weight of the propellers is preferably kept as low as possible.

OBJECT OF THE INVENTION

An object of this invention is to provide an improved contra-rotating rotor assembly for marine use.

THE INVENTION

In accordance with the present invention, a marine propulsion unit comprises two, axially-aligned and contra-rotating rotors one of which is rigidly attached to a drive shaft and drives the other rotor though a positionally-held planetary gear which is mounted on a static support sleeve through which the drive shaft passes and which is positioned between the two rotors while extending axially through one of them; the planetary gear being formed with a shaft extending parallel to the drive shaft and formed at its opposite end-portions with respective gear pinions one of which meshes with internal gearing on one of the rotors, and the other of which meshes with external gearing on the other rotor to transmit a reversing drive between them.

PREFERRED FEATURES OF THE INVENTION

Preferably the gear box has three, coaxial cylindrical sections of which the outer two sections are respectively formed by annular hubs of two contra-rotating rotors, and the intermediate cylindrical section supports a set of axially-parallel planetary gears which are circumferentially equi-spaced around the axis of the shaft. The three cylindrical sections are preferably spaced by seals which allow the outer two sections to rotate in opposite directions with respect to one another while preventing water from entering a gear box formed within the centre section and which may contain a lubricant. The external gearing, is preferably provided on the rotor which is rigidly attached to the drive shaft.

The design of the assembly of the invention is particularly well-suited to a marine propulsion unit as it is of robust construction and enables the intermediate cylindrical section of the gearbox to serve one or more of the following four functions: It enables a bearing for supporting one of the outer cylindrical sections to be mounted on an axially-extending portion of the intermediate section which can also carry the weight of one of the propellers. Secondly, it enables radial, fluid-straightening blades to be mounted between contra-rotating marine propellers and this can be useful to enhance the efficiency of operation of the assembly. Thirdly, if used in an outboard motor, it enables a gas exhaust passage to be formed through the intermediate section and the straightening blades, to convey exhaust gases from the outboard motor radially outwards to a position beyond the swept cylindrical volume of the propellers. This avoids the risk of the exhaust gas bubbles spoiling the efficiency of operation of the assembly. Fourthly, by arranging the axes of the individual planetary gears parallel to that of the drift shaft, the axial length of the planetary gears can be chosen to suit the spacing between the propellers, and use can then be made of stepped planetary gears having differently sized pinions at opposite ends, so that the rotational speeds of respective propellers can have a ratio other than 1:1.

The intermediate cylindrical section of the gearbox may also be used to support a cylindrical coaxially-arranged shroud around the outside of the volume swept by the rotating propellers. This shroud may be attached to the ends of the straightening vanes.

INTRODUCTION TO THE DRAWINGS

The invention will now be described in more detail, by way of example, with reference to accompanying partly diagrammatic drawings, in which:

In the Drawings

DESCRIPTION OF PREFERRED EMBODIMENT

Figure 1:
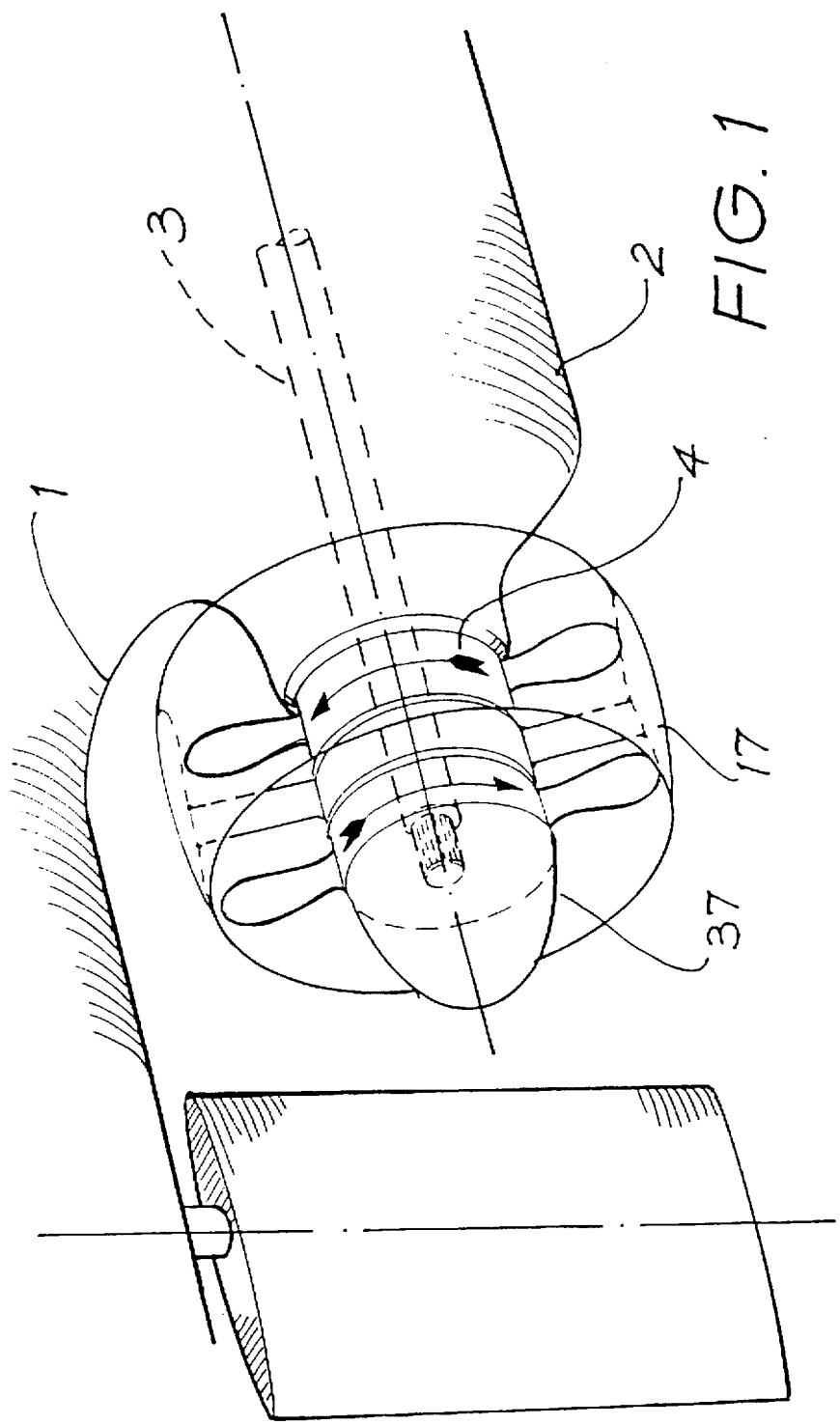
FIG. 1 is an artistic representation of the under-water stern portion end of a hull of a vessel to which a contra-rotating propeller assembly is fitted.

FIG. 1 shows the stern portion 1 of a ship having a hull 2 through the after-end of which extends a propeller shaft 3. A contra-rotating propeller assembly 4 is rigidly attached to the after end of the hull 2 by a ring of bolts, such as that referenced 22 in the modification of the assembly illustrated in FIGS. 2 and 3.

Figure 2:
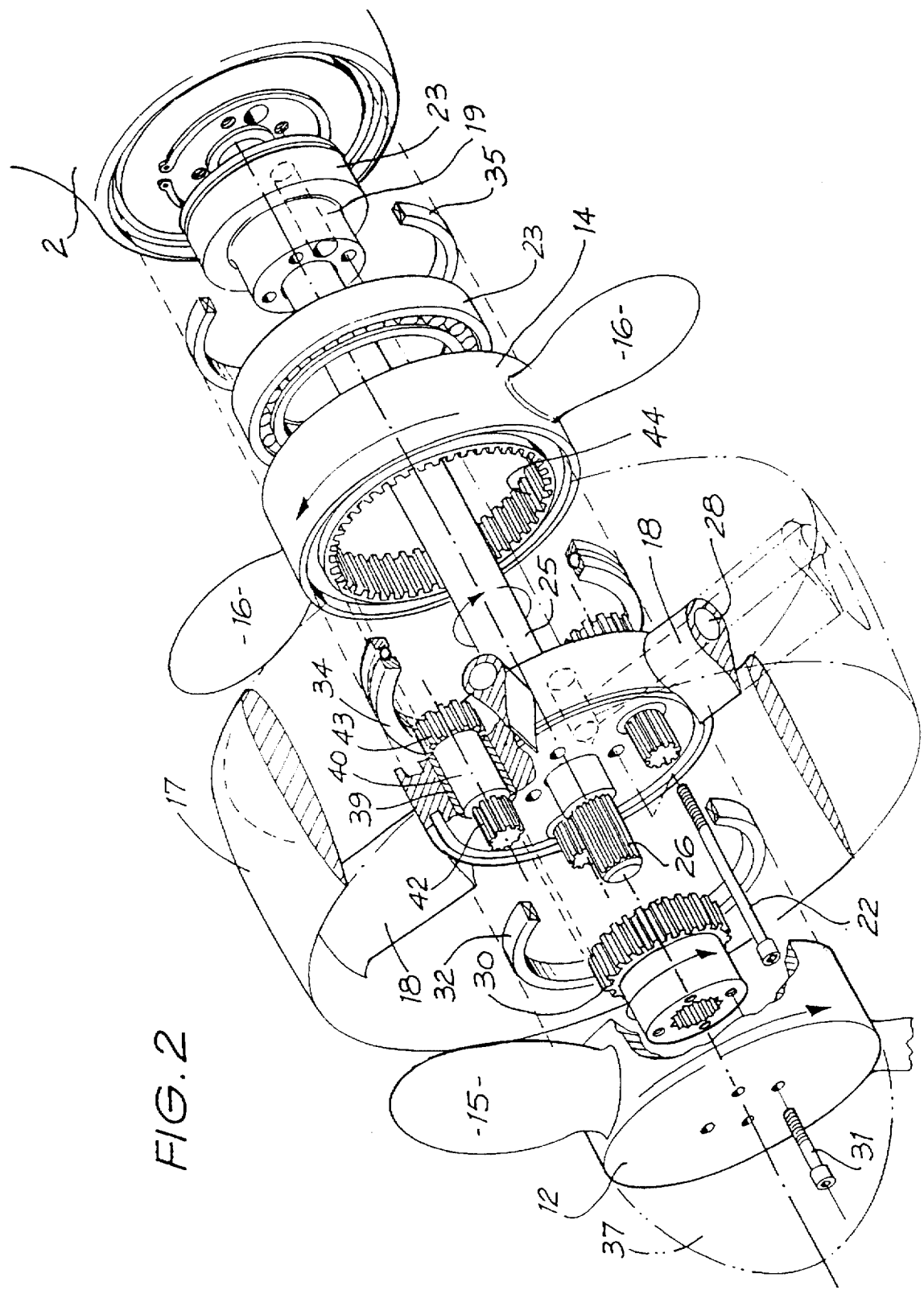
FIG. 2 is an exploded and partly-diagrammatic perspective view, partially cut away, of an assembly similar to that shown in FIG. 1 but modified for use as part of an outboard motor and, for convenience the same reference numerals as used in FIG. 1 have been used in FIGS. 2 and 3 to denote like parts.

FIG. 2 shows the parts from which the propeller assembly 4 is constructed. They comprise a gearbox 10 formed with three coaxial cylindrical sections 12, 13, and 14. The outer two sections 12 and 14 comprise annular rotatable propeller hubs from which respective sets of propeller blades 15 and 16 extend. The intermediate cylindrical section 13 is stationary and is formed with a central sleeve portion 19 which projects axially through the hub 14 and is held against rotation by the ring of bolts 22 connecting the section 13 either to the hull 2 in the arrangement shown in FIG. 1, or to the submerged tail-portion of an outboard motor in the arrangement shown in FIGS. 2 and 3.

Figure 3:
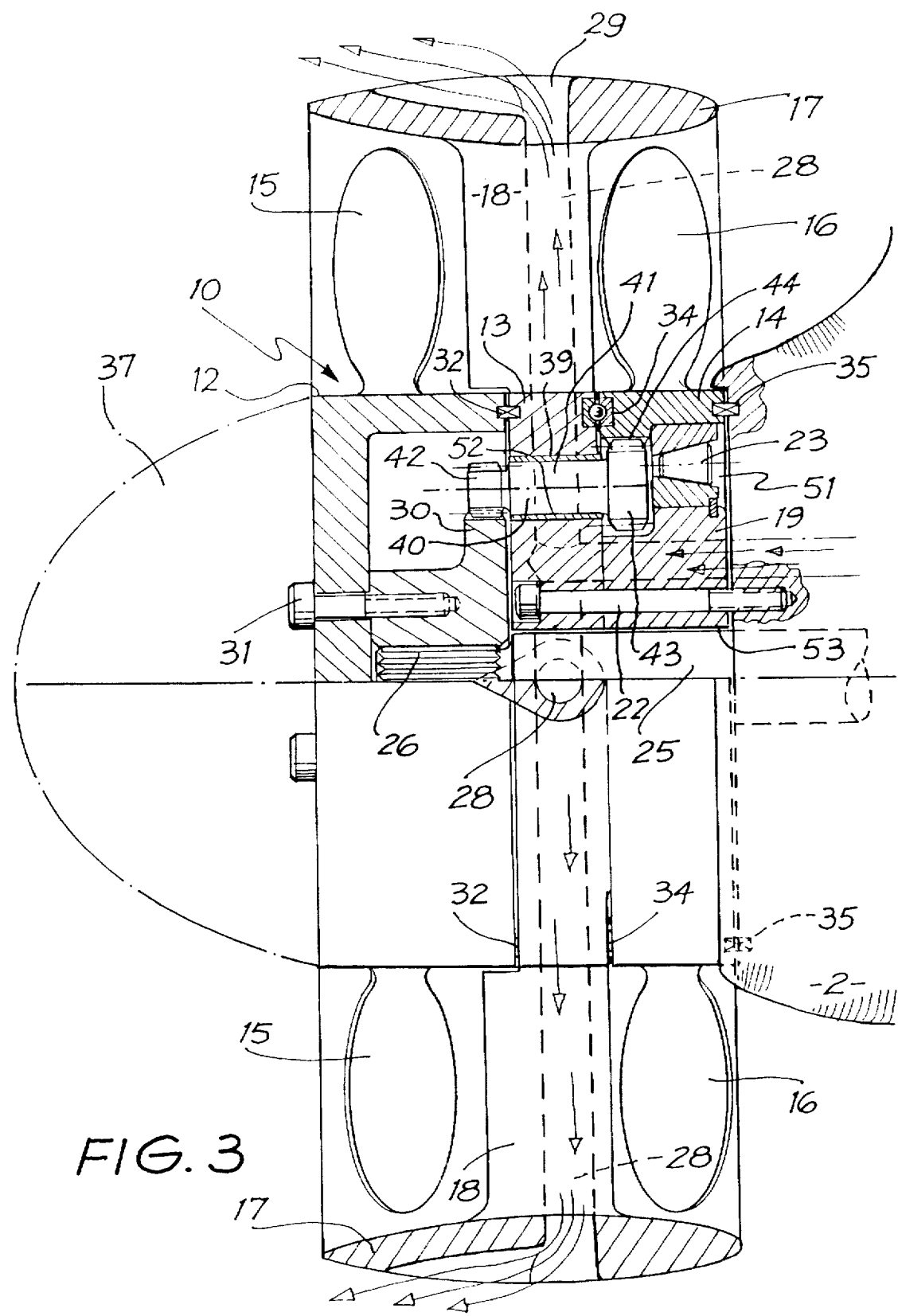
FIG. 3 is a sectional side elevation of the assembly of FIG. 2.

A set of flow straightening vanes 18 project radially outwards from the section 13 between the blades 15, 16 of the propellers, and supports a cylindrical shroud 17 which is coaxial with the gearbox, and is arranged radially outwards of the propeller blades 15 and 16. A gas exhaust passage 28 extends internally lengthwise of each blade and opens through the outside of the shroud 17, as is shown in FIG. 3, by way of a tear-drop shaped depression 29 which is shaped so that water flowing past it, generates a suction effect to facilitate the discharge of gas from the passage 28 when the shroud is travelling through the water . The passage 28 extends radially inwards through the interior of the intermediate section 13 and then axially forwards through the sleeve portion 19 to connect with a gas duct (not shown) through which exhaust gases from an internal combustion engine (also not shown) are discharged. A tapered roller bearing 23 is carried by the portion 19 within the gearbox 10, to carry the weight of the propeller hub 14 and its blades.

The propellers are turned in opposite directions by drive provided by a shaft 25 driven by the engine and extending axially through the centre of the intermediate section 13 of the gearbox. The after-end of the shaft 25 projects beyond the intermediate section 13, and is splined at 26 to the interior of an annular drive gear 30. The hub 12, which surrounds the gear 30, is provided with a conical shell 37 for the assembly, and is attached rigidly by bolts 31 to one end of the drive gear 30. A rubber annular pressure seal 32 is located between the hub 12 and the intermediate section 13 to prevent sea water entering the gearbox while allowing rotation of the hub 12. A second annular seal 34 is located between the intermediate section 13 and the other propeller hub 14. A third annular seal 35 is provided at the forward end of the hub 14 to complete the sealing of the gearbox.

Drive from the shaft 25 is transmitted by the gear 30 to a set of three, equi-angularly spaced, static, stepped, planetary driving gears 40 of which only one is illustrated in the drawings. Each gear 40 has a central shaft 41 passing through a lubricated, axial bore 39 in the intermediate section 13 which thus serves as a static carrier for the planetary gears. Two differently-sized pinions 42 and 43 are respectively provided at opposite ends of the gear 40. The smaller pinion 42 meshes with the gear 30 and the larger pinion 43 meshes with an internal gear 44 provided in the hub 14. Such an arrangement enables the two propellers to rotate at different speeds, in opposite directions.

The gearbox 10 is supplied with lubrication oil under pressure from a duct (not shown) opening into a chamber 51 at the forward-end of the roller bearing 23, as shown in FIG. 3. The lubrication oil flows through the bearing 23 and through channels 52 extending along the bores 39 to lubricate the shafts 41 of the planetary gears 40. The oil then flows inwardly between the gear 30 and the section 13 to a further lubrication channel 53 which extends forwardly along the drive shaft 25 to lubricate it also.

OPERATION OF PREFERRED EMBODIMENT

The above-described assembly operates as follows:

Drive to the propellers is provided by the shaft 25 which rotates the gear 30. This turns the planetary gears 41 by way of the pinions 42 which mesh with the gear 30, and also the propeller 15 by way of the hub 12 which is bolted to the end of the gear 30.

The planetary gears 40 are individually rotated in the opposite direction of rotation to the shaft 25, and cause rotation of the propeller 1 6 in the same direction as the gears 40 by the meshing if the pinion 43 with the internal gear 44 of the hub 14. However, the hub 14 rotates more slowly than the hub 12 as a result of the difference in the diameters of the pinions 42 and 43.

The blades 16 drive water through the interior of the shroud 17 and impart to it a twisting motion which is straightened by the vanes 18 before the water encounters the set of propeller blades 15. These rotate at a higher speed than the blades 16 and propel the water out of the rear of the shroud 17.

Exhaust gas from the outboard motor engine pass through the axial portion of the duct 28 located in the projecting portion 19, and then through the radial portions of the duct 28 to the outside of the shroud 17. The gas then dissipates in the stern wash of the vessel without encountering the propellers.

Lubrication oil is circulated through the gearbox from the chamber 51 and flows, as already described, through the tapered roller bearing 23 which supports the weight of the hub 14, through the bores 39 containing the shafts of the planetary gears 40, and then back along the channel 53 extending along the drive shaft 25. The lubrication oil is supplied at a pressure above that of the surrounding sea water, and is retained in the gearbox by the seals 32,34 and 35.

It will be observed from FIG. 3 that the propeller shaft 25 is freed of the weight of the hub 14, and the length of the shaft 25 supported in the intermediate cylindrical section 13, together with close proximity of the gear 30 and hub 12 to the section 13, ensure that only a very small portion of a the drive shaft 25 is subjected to bending movement when the propeller is in use.

MODIFICATION OF THE INVENTION

It is preferred to use a symmetrically arranged set of planetary gears to transmit drive between the two propeller blade hubs. However, there are circumstances when a single planetary gear will suffice.

Also, it is not essential for the two propellers to be driven at different speeds, and there are circumstances at which the contra-rotation of the two propellers at the same speed will be required, for example when it is required that the torques produced by the propellers shall be self-cancelling as is desired in some torpedo drive units.

I claim:

1. A marine propulsion unit comprising two, axially-aligned and contra-rotating rotors one of which is rigidly attached to a drive shaft and drives the other rotor through a positionally-held planetary gear which is mounted on a static support sleeve through which the drive shaft passes and which is positioned between the two rotors while extending axially through one of them; the planetary gear being formed with a shaft extending parallel to the drive shaft and formed at its opposite end-portions with respective gear pinions one of which meshes with internal gearing on one of the rotors, and the other of which meshes with external gearing on the other rotor to transmit a reversing drive between them.

2. A unit as claimed in claim 1, in which said rotors are annular and a cylindrical gearbox being co-axial with said rotors and arranged co-axially around the drive shaft; the planetary gear comprising a set of planetary gears which are circumferentially equi-spaced around the axis of the shaft and are axially parallel thereto, the rotors and cylindrical gearbox being provided with seals which allow the rotors to rotate in opposite directions with respect to the cylindrical gearbox while preventing water from entering the gearbox; and the rotor, which is rigidly attached to the drive shaft, is provided with said external gearing.

3. A unit as claimed in claim 2, in which the cylindrical gearbox provides a chamber containing the planetary gear and has the sleeve extending axially from one side and providing a support for a bearing which supports the weight of one of the rotors.

4. A unit as claimed in claim 2, in which the cylindrical gearbox is provided with radially projecting, flow-straightening vanes.

5. A unit as claimed in claim 4, in which the rotors respectively comprise marine propellers and a cylindrical shroud coaxially surrounds both of them and is fixed to the outer ends of the vanes.

6. A unit as claimed in claim 4, forming part of a marine outboard motor which has an exhaust gas venting duct extending through the sleeve of the cylindrical gearbox and through at least one of the vanes, the duct being arranged to discharge gas outside of the swept volume of the propeller blades.

7. A unit as claimed in claim 6, in which the outer-end of the duct opens into a tear-drop shaped depression which induces suction in the outer end of the duct when water is traveling past it.

* * * * *